United States Patent Office 3,072,616
Patented Jan. 8, 1963

3,072,616
COPOLYMERS OF SULFUR DIOXIDE AND DIALLYL COMPOSITIONS
Charles D. Wright, North St. Paul, Minn., and William S. Friedlander, Hudson, Wis., assignors to Minnesota Mining and Manufacturing Company, St. Paul, Minn., a corporation of Delaware
No Drawing. Filed Dec. 28, 1959, Ser. No. 862,063
11 Claims. (Cl. 260—78.4)

This invention relates to copolymers and particularly to copolymers of sulfur dioxide and certain 1,6-diunsaturated compounds.

It is an object of this invention to provide soluble substantially linear copolymers. A further object is to provide soluble sulfur-containing polymers having good stability up to about 200° C. An additional object is to provide a process for the preparation of the copolymers of the invention. Other objects will become apparent hereinafter.

In accordance with these and other objects of this invention, it has been found that substantially linear polymers having very good stability at 200° C. are produced by copolymerizing sulfur dioxide and certain 1,6-diunsaturated compounds. These may be considered either as copolymers of sulfur dioxide and the organic substance or as polymers of the recurring units as hereinbelow set forth.

It is found that certain substances in which two allyl groups are linked by an atom of the group consisting of carbon, nitrogen and sulfur, in which none of the valences of the said linking atom are satisfied by hydrogen, can be copolymerized in a 1:1 ratio with sulfur dioxide to produce organic solvent-soluble copolymers. Functional groups in which carbon, at least doubly bound to an oxygen or nitrogen atom, e.g. cyano, carboalkoxy or acyl, is not more than one carbon atom removed from the linking atom, as well as sulfonyl groups, appear to activate or in some other way influence reactivity of the 1,6-diunsaturated compound in formation of the linear, soluble copolymers of this invention.

The 1,6-disunsaturated compounds useful in the invention to provide copolymers soluble in organic solvents can be described by the general formula:

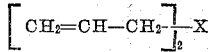

wherein X is a divalent linking radical of the group consisting of

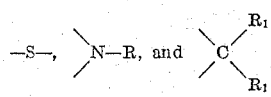

wherein R is a member of the group consisting of cyano, cyanomethyl, alkanoyl and —SO$_2$R$_2$ radicals; R$_1$ is a member of the group consisting of cyano and lower carboalkoxy radicals; R$_2$ is a member of the group consisting of alkyl radicals having from 1 to 8 carbon atoms, perfluoroalkyl radicals having from 1 to 12 carbon atoms, and the phenyl radical.

While it has been known heretofore the sulfur dioxide will add to unsaturated monomers containing an olefinic linkage, or to vinyl monomers, resins thus prepared have had limited use because of their poor temperature stability. It is also known that sulfur dioxide will react with diallyl ether, and the copolymer thus prepared has been found by us to be a highly crosslinked, intractable solid material, virtually insoluble in any organic solvent and which appears to be useless for practical purposes.

Surprisingly, it has been found that the copolymers of the present invention are substantially linear, stable materials which are soluble in various organic solvents and which have excellent thermal stability. They are useful for the production of films, molded articles and protective and decorative coatings, as well as for insulating coatings for electrical equipment and as adhesive components.

In the course of the reaction in which the copolymers of the present invention are formed, the diallyl compound cyclizes to form a six-membered ring system which includes the divalent linking radical of the group referred to above. These rings appear to be connected through a methylene group to the sulfone groups formed from the sulfur dioxide.

Illustrative examples of 1,6-disunsaturated compounds suitable for copolymerization according to the present invention are:

Diallyl sulfide
Diallyl diethylmalonate
Diallyl dimethylmalonate
Diallyl ethylcyanoacetate
Diallyl malononitrile
N,N-diallyl perfluorooctanesulfonamide
N,N-diallyl acetamide
N,N-diallyl butyramide
Diallylcyanamide
N,N-diallyl amino acetonitrile
N,N-diallyl benzenesulfonamide
N,N-diallyl butanesulfonamide
N,N-diallyl octanesulfonamide Broadly speaking, the process of the invention is carried out by interreacting the starting substituted diene having the formula:

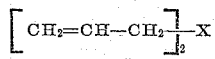

wherein X has the same significance as set out hereinabove, and a stoichiometric excess of sulfur dioxide, in the presence of a catalyst. The catalyst which can be used is any catalyst which catalyzes the addition of sulfur dioxide to an ethylenic unsaturation, such as ammonium nitrate, silver nitrate, or a free radical initiator, e.g. azobisisobutyronitrile; peroxides, e.g. benzoyl peroxide; hydroperoxides, e.g. tert-butyl hydroperoxide, and the like. The amount of catalyst employed ranges from about 0.0005 to about 15 percent by weight. While it is preferred to employ an excess of sulfur dioxide, this is not essential since in any event, the copolymer consists of substantially equimolar quantities of sulfur dioxide and the 1,6-diunsaturated compound.

Owing to the gaseous nature of sulfur dioxide at room temperature and atmospheric pressure, the reaction is most conveniently carried out under slight to moderate pressure at temperatures up to about 100° C. or higher in a closed vessel, or under temperature conditions at which sulfur dioxide is a liquid, such as −10° C. or lower. If desired, inert diluents such as water, dimethyl formamide or dimethylsulfoxide, can be employed in the reaction mixture. The reaction time can vary from as little as half an hour or less up to several days, depending on various factors such as the molecular weight desired, presence of inhibiting impurities and the like. Ordinarily, the reaction is carried out until a substantial amount of solid copolymer is obtained.

The organic solvent-soluble copolymers of the invention are believed to comprise from about 5 to probably 1000 or more recurring units represented by the formula:

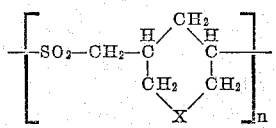

wherein X represents a divalent linking radical of the group consisting of –S–,

and

R and R₁ having the same significance as hereinabove, and $n$ is a number from about 5 to 1000 or higher. It is of course to be understood that as in the case of polymers in general, $n$ represents an average of the numbers of units in chains of varying lengths since the copolymer will consist of a number of molecules of different chain length. Such structures, although including rings, are linear in the overall sense of being not crosslinked and the term "linear" will be understood to have this meaning throughout this specification and in the claims.

The chain structures of the copolymers of the invention are terminated by end groups which depend upon the initiators used, as well as impurities present and/or terminating agents intentionally added. The end or terminating groups are, however, only a minor part of the molecule and so far as can be determined do not in the case of the copolymers of this invention substantially change the nature of the polymer chains.

Having thus described the copolymers of the invention and the manner by which they are obtained, the invention is now more particularly illustrated by examples showing the best mode contemplated of practicing the invention. In these examples all parts are by weight unless otherwise indicated and inherent viscosities are determined by standard procedures, in the solvents and at the concentrations indicated.

EXAMPLE 1

In a thick-walled ampoule are placed 11.4 parts of once redistilled diallyl sulfide, 0.75 part by volume of a saturated solution of silver nitrate in 95 percent ethanol and 6.4 parts of liquid sulfur dioxide. The ampoule and contents are cooled in liquid nitrogen and sealed and then heated with agitation (shaking) at 50° C. for about 65 hours. The ampoule is then cooled, opened and the brownish solid which has formed is dissolved in dimethyl formamide, from which the desired copolymer is precipitated by adding the solution to several volumes of methanol. This operation is repeated and the light tan-colored copolymer thus obtained is found to melt at about 145° to 155° C., and to have inherent viscosity 0.049 in dimethyl formamide solution at 1.11 g./100 ml. concentration. The last traces of dimethyl formamide can be removed from the copolymer only with difficulty and it is still found to be present in detectable amount by infrared analysis. This is further reflected in the analytical results. Heating the copolymer at 200° C. for one hour at about 0.1 mm. Hg pressure results in 7.7 percent loss of weight and considerable darkening.

In another preparation 10 parts of diallyl sulfide and 14 parts of sulfur dioxide are heated as described above with 0.62 part of azobisisobutyronitrile as catalyst. The ampoule is then cooled, the contents are dissolved in dimethyl formamide and the copolymer is precipitated with methanol. The copolymer is precipitated twice more in this manner and dried at about 10 mm. Hg pressure at 80° C. for 16 hours. The white solid copolymer has an inherent viscosity of 0.06 at a concentration of 1.09 g./100 ml. in dimethyl formamide. It is also soluble in dimethyl sulfoxide.

EXAMPLE 2

A mixture of 5 parts of diallyl diethylmalonate, 3.08 parts of sulfur dioxide (twice the stoichiometric amount) and 0.5 part by volume of a saturated solution of silver nitrate in 95 percent ethanol is heated in a sealed ampoule at 50° C. for 2 hours with shaking. A transparent copolymer is formed which coats the walls of the ampoule. The ampoule is cooled and opened and volatile material is removed from the reaction mixture by evaporation. The residual copolymer dissolves slowly in hot dimethylformamide. A hot solution of the copolymer in dimethylformamide is poured slowly into stirred methanol to precipitate the copolymer, which is then collected and dried at 50° C. in vacuo for 3 hours. The hard white copolymer melts at 120° to 130° C. Infrared spectroscopic data are consistent with the probable structure:

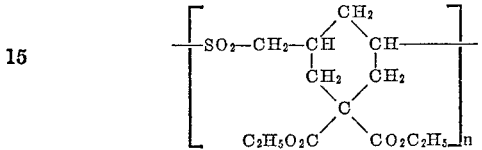

The inherent viscosity is found to be 0.478 in acetone at 0.939 g./100 ml. which is believed to correspond to an average value of $n$ of about 100 to 200. The copolymer shows excellent thermal stability. A sample heated at 200° C. for 1 hour at 0.1 mm. Hg loses about 0.6 percent in weight and does not darken. It is soluble in methylene chloride, acetone, dimethylformamide and acetonitrile. The yield is essentially quantitative.

The preceding procedure is repeated using twice the quantity of sulfur dioxide, i.e. four times the amount necessary for equimolar reaction. The copolymer is dissolved in methylene chloride and precipitated with methanol for purification. The copolymer is identical to that described above. It is thus shown that the process can be carried out using an excess of sulfur dioxide and that the copolymer in this case is still formed between substantially stoichiometric or equimolar quantities of the reactants.

The first procedure set forth in this example is repeated using 15 parts of diallyl diethyl malonate, 9.6 parts of sulfur dioxide (1:2 ratio) and 0.75 part of the silver nitrate catalyst solution. The product copolymer is worked up by precipitating once from solution in methylene chloride with methanol and twice from acetone solution with methanol. The white copolymer thus obtained has an inherent viscosity of 0.67 in methylene chloride at 0.20 g./100 ml. The copolymer shows excellent stability toward heating in air. Films of the copolymer are readily prepared by casting from a solution of the copolymer in methylene chloride. Likewise, coatings can be applied to clean metal surfaces by brushing or spraying on a 10 percent w./v. solution of the copolymer in methylene chloride. The copolymer can also be molded at about 255° F., under pressure.

It has been found that the copolymers of this invention can also be produced in an emulsion polymerization system. The following example sets forth the use of such a method for production of the copolymers of the invention.

EXAMPLE 3

A mixture of 4 parts of diallyl diethylmalonate, 2.64 parts of sulfur dioxide and 5.4 parts of water containing 0.015 part of ammonium nitrate and 0.15 part of sodium lauryl sulfate (Duponol) is sealed in a glass ampoule and heated with agitation at 50° C. for about 3 hours. The mixture (containing a little precoagulum) is cooled, the ampoule is opened and the contents poured into methanol. The copolymer formed in the reaction precipitates and is recovered, dried in vacuo, and then taken up in acetone to form a viscous solution, from which the copolymer is recovered by precipitation with methanol. After thorough drying, the white solid copolymer is found to have inherent viscosity in acetone of about 1.44 at 0.478 g./100 ml. in acetone. The number of repeating units in the copolymer chain ($n$ in the formula given in Example 2 above) is therefore believed to be of the order of about 1000.

It is found that somewhat higher concentrations of emulsifying agent and catalyst increase the yield slightly, but the inherent viscosity of the copolymer is somewhat lower.

Particularly satisfactory results are obtained by use of the following procedure: 60 parts of diallyl diethyl malonate, 38.7 parts of sulfur dioxide, 15 parts by volume of a solution of 15.656 parts by weight of sodium lauryl sulfate (Duponol) in 100 parts of boiled distilled water, 8.65 parts by volume of a solution of 2.27 parts by weight of ammonium nitrate in 100 parts of boiled distilled water, and 115 parts of water are placed in a sealed vessel. The reaction mixture is heated at 50° C. for 6 hours with agitation. A latex is formed with little or no precoagulum. The latex is then poured into 2500 parts by volume of reagent grade methanol and the copolymer which was formed in the reaction separates as a fine solid. The precipitated copolymer is stirred in the methanol for 2 hours, collected and dried. It is heated with about 400 parts by volume of chloroform for 3 hours and dissolves to a very viscous solution, from which it is again precipitated using about 2000 parts by volume of methanol. The copolymer is rather rubbery after coagulation and it is cut up and stirred with a further portion of methanol for about 2 hours, collected and dried. The white copolymer thus prepared has inherent viscosity of about 1.67 in acetonitrile, at 0.507 g./100 ml.

EXAMPLE 4

A mixture of 15 parts diallyl ethyl cyanoacetate, 10 parts of sulfur dioxide and 1.5 parts by volume of a saturated solution of silver nitrate in 95 percent ethanol is heated in a sealed ampoule for 16 hours at 50° C. with agitation. The copolymer formed is isolated as described in the preceding examples by dissolving it in acetone and precipitating with methanol. The precipitate is dried and the solid white copolymer thus prepared is readily soluble in acetone and acetonitrile and dissolves more slowly in methylene chloride and ethyl acetate. Saturated solutions of the copolymer in acetone can be used to produce coatings on wires and the like by drawing the objects to be coated therethrough, and evaporating the solvent. Likewise, the solutions can be flowed or brushed over surfaces to be coated. If desired, dyes or pigments or the like can be added to the solutions, as well as plasticizers or other adjuvants. It is almost insoluble in benzene, chloroform, tetrahydrofuran and methyl ethyl ketone. The copolymer softens sufficiently when heated to about 160° C. to be pressed out to a clear film. It is found to have inherent viscosity of 0.233 in acetone at 0.923 g./100 ml. and 0.271 in acetonitrile at 1.028 g./100 ml. A sample of the copolymer is purified for analysis by dissolving it is acetone and reprecipitating from methanol. Analysis shows the following:

Calculated for $(C_{11}H_{15}NO_4S)_n$: C, 50.4%; H, 5.9%; N, 5.5%; S, 12.45%. Found: C, 49.8%; H, 6.1%; N, 5.27%; S, 12.3%.

The results obtained on analysis show that the copolymers of the invention are formed from equimolar amounts of the 1,6-diunsaturated compound and sulfur dioxide.

EXAMPLE 5

A mixture of 2 parts of diallyl ethyl cyanoacetate, 3.7 parts (3 moles) of sulfur dioxide, 6 parts by volume of acetonitrile and 1 part by volume of an approximately 0.5 percent wt./vol. solution of silver nitrate in 95 percent ethanol as a catalyst is heated in a sealed vessel for 6 hours at 50° C. The copolymer formed is precipitated by pouring the reaction mixture into several volumes of methanol. The white copolymer thus obtained is dried in vacuo. It has inherent viscosity 0.150 in acetonitrile at a concentration of 1.00 g./100 ml.

Emulsion copolymerization of sulfur dioxide and diallyl ethyl cyanoacetate is effected as described in Example 3. The emulsifier solution is 0.119 g./ml. of sodium lauryl sulfate (Duponol) in boiled distilled water and the catalyst solution is 0.042 g./ml. of ammonium nitrate in boiled distilled water. Table I shows the proportions of catalyst, emulsifier, water (all in parts by volume) and reaction times in hours at 50° C., which are employed to produce copolymers insoluble in methanol and having the inherent viscosities in acetonitrile at about 0.40 g./100 ml. noted. In each case 3 parts by weight of diallyl ethyl cyanoacetate and 1.98 parts by weight of sulfur dioxide are employed.

Table I

| Run | Catalyst | Emulsifier | Water | Time (hours) | Inherent Viscosity |
|---|---|---|---|---|---|
| 1 | 0.37 | 2.69 | 4.2 | 1.5 | a 0.25 |
| 2 | 0.65 | 2.69 | 3.9 | 3.5 | b 0.719 |
| 3 | 0.65 | 3.75 | 3.0 | 1.5 | 0.694 |
| 4 | 0.93 | 1.68 | 4.6 | 1.5 | 0.516 |
| 5 | 0.93 | 1.68 | 4.6 | 3.5 | b 0.598 | a Very low yield.
b Reaction mixture completely coagulated.

The copolymers obtained from runs 2 through 5 soften on heating at about 150° to 160° C.

When smaller amounts of emulsifier are used with the lower proportions of catalyst, no copolymer is obtained on precipitation of the reaction mixture in methanol unless special precautions are taken to remove traces of oxygen. This is illustrated by the following procedure. An ampoule is charged with 2 parts of diallyl ethyl cyanoacetate and of catalyst, emulsifier and water as used above in the required amounts and the contents frozen, evacuated, thawed (under nitrogen) and again frozen, and evacuated. Sulfur dioxide (1.35 parts) is then introduced and the ampoule is sealed and agitated at 50° C. for 19 hours. In each of two runs using 0.132 part of emulsifier, and 0.006 and 0.009 part of ammonium nitrate, respectively, dissolved in about 0.8 part of water, polymerization is found to result in the formation of a hard lump of copolymer in excellent yield. The inherent viscosities of the copolymers formed are respectively 0.693 and 0.612, at concentrations of about 0.5 g./100 ml. in acetonitrile.

EXAMPLE 6

N,N-diallyl perfluorooctanesulfonamide is prepared from perfluorooctanesulfonyl fluoride described in U.S. Patent No. 2,732,398 by the following procedure:

To a flask containing 14.3 parts (0.025 mole) of allylamine dissolved in 300 parts by volume of ether, is added a solution of 50.2 parts (0.1 mole) of perfluorooctanesulfonyl fluoride in 50 parts by volume of ether. The reaction mixture is allowed to stand at room temperature overnight and is then filtered to remove the hydrofluoride salt of allylamine. The ethereal filtrate is washed with dilute hydrochloric acid and with water. After drying over anhydrous calcium sulfate, the ether is removed by evaporation to provide 49.9 parts of crude product (92.6% yield). This is purified by recrystallization from carbon tetrachloride, yielding the relatively pure compound, identified as N-allyl perfluorooctanesulfonamide:

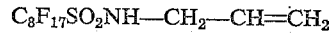

$C_8F_{17}SO_2NH-CH_2-CH=CH_2$ melting at 84.8–85.5° C.

*Analysis.*—Calculated: C, 24.5%; F, 59.9%; N, 2.60%. Found: C, 24.3%; F, 59.7%; N, 2.63%.

To a flask containing 1.3 parts of KOH dissolved in 100 parts by volume of water is added 10.78 parts of the above N-allyl perfluorooctanesulfonamide, and then 5 parts by volume of allyl bromide. The flask is shaken overnight at room temperature and the mixture is refluxed for one hour. An oily layer and an aqueous layer form on standing and are separated. The aqueous product is extracted with ether, and the ether extract and the oily product are combined and distilled to remove ether. The residue is then distilled under reduced pressure, yielding 7 parts of product identified as relatively pure N,N-diallyl perfluorooctanesulfonamide.

$$C_8F_{17}SO_2N(CH_2CH=CH_2)_2$$

having a boiling point of 92–93° C. at 1–2 mm. pressure.

*Analysis.*—Calculated: F, 55.8%; N, 2.42%. Found: F, 55.6%; N, 2.46%.

Two ampoules are charged with reaction mixtures as follows:

|  | Ampoule | |
| --- | --- | --- |
|  | (a) | (b) |
| N,N-diallyl perfluorooctanesulfonamide ........parts.. | 33.8 | 35.9 |
| Sulfur dioxide........................................do.... | 11.2 | 11.9 |
| Azobisisobutyronitrile..............................do.... | 2.3 | 2.5 |

The ampoules are cooled, evacuated, sealed and then heated at 75° C. for 1 hour with shaking. The reaction mixtures become more solid and the copolymers formed are recovered by dissolving the contents of each tube in a boiling 50:50 mixture by volume of dimethyl formamide and benzotrifluoride. The solutions are combined and then precipitated by adding them to several volumes of methanol. The precipitate is collected, redissolved and the precipitation is repeated. The copolymer is dried at about 60° C. in vacuo for about 16 hours. The copolymer is a light yellow waxy solid and has inherent viscosity 0.044 at 0.400 g./100 ml. in a 50:50 mixture of dimethyl formamide and benzotrifluoride.

EXAMPLE 7

N,N-diallyl benzenesulfonamide is prepared by reaction of benzene sulfonyl chloride with diallylamine in the presence of an excess of aqueous potassium hydroxide.

A mixture of 5.0 parts of N,N-diallyl benzenesulfonamide, 3.85 parts of sulfur dioxide and 0.3 part by volume of 0.50 percent (wt./vol.) silver nitrate in 95 percent ethanol is heated in a sealed ampoule at 50° C. for 1 hour and then allowed to stand at room temperature for 3 days. After evaporation of volatile materials, the residue of the reaction mixture containing the copolymer of sulfur dioxide and N,N-diallyl benzenesulfonamide is dissolved in hot dimethylformamide, the solution is clarified by filtration and poured into several volumes of methanol. The precipitated copolymer is collected and dried. The white, solid copolymer melts at about 210° C. to a viscous liquid which is only slightly discolored by heating to 230° C. It has inherent viscosity 0.050 at 0.2 g./100 ml. of dimethylformamide.

Three parts of N,N-diallylacetamide, 3.85 parts of sulfur dioxide and 0.3 part by volume of the silver nitrate catalyst solution are heated at 50° C. for 18 hours and allowed to stand about 2 days at room temperature. The copolymer of sulfur dioxide and N,N-diallyl acetamide is recovered by the preceding procedure and is a white solid with properties similar to those of the copolymer of sulfur dioxide and N,N-diallyl-benzenesulfonamide and possesses inherent viscosity 0.12 in concentration of 0.534 g./100 ml. in dimethyl formamide.

N,N-diallyl methanesulfonamide is prepared from diallyl amine and methanesulfonyl chloride by the above procedure: A mixture of 5.0 parts of N,N-diallylmethanesulfonamide, 2.7 parts of sulfur dioxide and 0.30 part of azobisisobutyronitrile is heated for 16 hours at 75° C. and is then precipitated in methanol. The substantially colorless linear copolymer is dissolved in dimethyl formamide and reprecipitated with methanol. It is a light buff colored solid with properties rather similar to the above sulfonamide-containing copolymers and has an inherent viscosity 0.23 at a concentration of 1 g./100 ml. of dimethyl formamide.

EXAMPLE 8

A mixture of 0.5 part of redistilled diallylamino acetonitrile, 7.05 parts of sulfur dioxide and 0.2 part of benzoyl peroxide is heated at 50° C. for 16 hours and allowed to stand at room temperature for about 3 weeks. The copolymer, isolated by the procedure described in Example 8, and reprecipitated 3 times with methanol is pale yellow in color and has inherent viscosity of 0.217 at about 1 g./100 ml. of dimethyl formamide.

EXAMPLE 9

Diallylcyanamide undergoes rapid reaction with sulfur dioxide to copolymerize and has a tendency to crosslink in bulk polymerization, and to form large amounts of precoagulum when emulsion polymerization techniques are employed with water alone as the suspending medium. The dilution of bulk polymerization reaction mixtures with about 10 percent to 50 percent of dimethyl formamide permits copolymerization to proceed at a rate such that soluble polymer is produced.

In each of three Erlenmeyer flasks are placed 3 g. of diallylcyanamide and 0.33, 1.0 and 3.0 g. of dimethyl formamide, respectively. To each flask are added 4.8 g. of liquid sulfur dioxide, the flasks are stoppered immediately and the reaction mixture are permitted to stand at ambient temperature for 30 minutes. The contents are then separately added to several volumes of methanol and the precipitated polymers separated and dried. The soluble white solid copolymers thus formed are found to weigh 0.70 g., 0.45 g. and 0.39 g., respectively. They are soluble in boiling dimethyl formamide.

What is claimed is:

1. A substantially linear copolymer of sulfur dioxide and a substantially equimolar amount of a compound of the formula:

$$\left[ CH_2=CH-CH_2 \right]_2 - X$$

wherein X is a divalent linking radical of the group consisting of

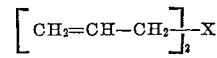

wherein R is a member of the group consisting of cyano, cyanomethyl, aliphatic acyl and —SO$_2$R$_2$ radicals; R$_1$ is a member of the group consisting of cyano and lower carboalkoxy radicals; and R$_2$ is a member of the group consisting of alkyl radicals having from 1 to 8 carbon atoms, perfluoroalkyl radicals having from 1 to 12 carbon atoms, and the phenyl radical.

2. A solid polymer consisting essentially of recurring units of the formula:

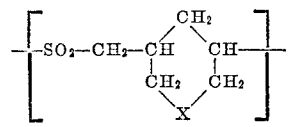

wherein X is a divalent linking radical of the group consisting of:

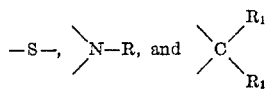

wherein R is a member of the group consisting of cyano, cyanomethyl, aliphatic acyl and —SO$_2$R$_2$ radicals; R$_1$ is a member of the group consisting of cyano and lower carboalkoxy radicals; and R$_2$ is a member of the group consisting of alkyl radicals having 1 to 8 carbon atoms, perfluoroalkyl radicals having from 1 to 12 carbon atoms, and the phenyl radical.

3. A copolymer of sulfur dioxide with diallyl sulfide.
4. A copolymer of sulfur dioxide with a diallyl lower dialkyl malonate.
5. A copolymer of sulfur dioxide with a diallyl lower alkyl cyanoacetate.
6. A copolymer of sulfur dioxide with a N,N-diallyl perfluoroalkanesulfonamide.
7. A copolymer of sulfur dioxide with N,N-diallyl acetamide.
8. A copolymer of sulfur dioxide with diallyl cyanamide.
9. A copolymer of sulfur dioxide with N,N-diallyl-amino-acetonitrile.
10. A copolymer of sulfur dioxide with an N,N-diallyl-alkene-sulfonamide.
11. The process for the production of a copolymer, which comprises bringing together sulfur dioxide and a compound of the formula:

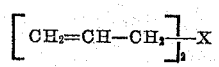

wherein X is a divalent linking radical of the group consisting of:

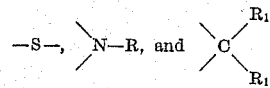

wherein R is a member of the group consisting of cyano, cyanomethyl, aliphatic acyl and $-SO_2R_2$ radicals; $R_1$ is a member of the group consisting of cyano and lower carboalkoxy radicals; and $R_2$ is a member of the group consisting of alkyl radicals having from 1 to 8 carbon atoms, perfluoroalkyl radicals having from 1 to 12 carbon atoms, and the phenyl radical; in the presence of a catalyst for the addition of sulfur dioxide to an ethylenic unsaturation, until a substantial amount of solid copolymer is obtained.

References Cited in the file of this patent
UNITED STATES PATENTS

| | | |
|---|---|---|
| 2,578,063 | Hackmann | Dec. 11, 1951 |
| 2,695,834 | De Nie | Nov. 30, 1954 |
| 2,914,511 | Errede et al. | Nov. 24, 1959 |
| 2,921,964 | Ramsden | Jan. 19, 1960 |